(12) United States Patent
Ott et al.

(10) Patent No.: US 6,512,026 B1
(45) Date of Patent: Jan. 28, 2003

(54) POWDER CLEAR VARNISH AND AQUEOUS POWDER CLEAR VARNISH SLURRY

(75) Inventors: Günther Ott, Münster (DE); Ulrike Röckrath, Senden (DE); Stephan Schwarte, Emsdetten (DE); Joachim Woltering, Münster (DE); Heinrich Wonnemann, Telgte (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/786,593

(22) PCT Filed: Aug. 11, 1999

(86) PCT No.: PCT/EP99/05891

§ 371 (c)(1),
(2), (4) Date: Apr. 2, 2001

(87) PCT Pub. No.: WO00/15725

PCT Pub. Date: Mar. 23, 2000

(30) Foreign Application Priority Data

Sep. 10, 1998 (DE) .......................... 198 41 408

(51) Int. Cl.$^7$ .............................. C08K 3/20; C08L 63/02
(52) U.S. Cl. ................. 523/409; 523/410; 523/456; 525/327.3; 525/375; 525/386; 528/405; 528/418
(58) Field of Search ................... 523/409, 410, 523/456; 525/327.3, 375, 386; 528/405, 418

(56) References Cited

U.S. PATENT DOCUMENTS

| | | | |
|---|---|---|---|
| 3,341,580 A | 9/1967 | Hechenbleikner | 260/541 |
| 3,477,990 A | 11/1969 | Dante et al. | 260/47 |
| 3,781,379 A | 12/1973 | Theodore et al. | 260/836 |
| 4,091,048 A | 5/1978 | Labana et al. | 260/836 |
| 4,268,542 A | 5/1981 | Sakakibara et al. | 427/195 |
| 4,939,213 A | 7/1990 | Jacobs, III et al. | 525/329.9 |
| 5,084,541 A | 1/1992 | Jacobs, III et al. | 528/45 |
| 5,475,073 A | 12/1995 | Guo | 526/333 |
| 5,480,493 A | 1/1996 | Harry, Jr. | 134/4 |
| 5,534,598 A | 7/1996 | Guo | 525/329.2 |
| 5,739,216 A * | 4/1998 | Duecoffre | 528/438 |

FOREIGN PATENT DOCUMENTS

| | | | |
|---|---|---|---|
| BE | 756 693 | 3/1971 | |
| DE | 27 49 576 B2 | 11/1977 | ......... C08F/220/18 |
| DE | 44 01 544 A1 | 1/1994 | ........... C08G/18/32 |
| DE | 195 34 361 A1 | 9/1995 | ......... C09D/175/14 |
| DE | 196 13 547 A1 | 4/1996 | ............ C09D/5/46 |
| EP | 0 299 420 A2 | 7/1988 | ............ C09D/3/58 |
| EP | 0 624 577 A1 | 5/1994 | ........ C07D/251/70 |
| EP | 0 708 788 B1 | 6/1994 | ........... C08G/18/08 |
| EP | 0 767 185 A1 | 6/1995 | ......... C08F/212/06 |
| EP | WO 99/15593 | 1/1999 | |
| EP | WO 99/15598 | 1/1999 | |

OTHER PUBLICATIONS

Encyklopädie der technischen Chemie, 3rd edition, vol. 14, Urban & Schwarzenberg, Munich, Berlin, 1963, pp. 80–89 and 99–105.

* cited by examiner

Primary Examiner—Robert Dawson
Assistant Examiner—D. Aylward

(57) ABSTRACT

Novel powder clearcoat materials and novel powder clearcoat slurries comprising a) at least one epoxide-containing binder containing from 0.5 to 40% by weight, based on the binder, of copolymerized glycidyl-containing monomers, and b) at least one tris(alkoxy-carbonylamino) triazine and at least one polycarboxylic acid, in particular a straight-chain dicarboxylic acid, and/or a carboxy-functional polyester as crosslinking agent, or alternatively a) at least one tris(alkoxy-carbonylamino)triazine and at least one oligomeric or polymeric, epoxide-containing crosslinking agent containing from 0.5 to 40% by weight, based on the crosslinking agent, of copolymerized glycidyl-containing monomers, and/or a low molecular mass, epoxide-containing crosslinking agent, and b) at least one carboxyl-containing polymer as binder, both variants comprising c) at least one polyol.

24 Claims, No Drawings

POWDER CLEAR VARNISH AND AQUEOUS POWDER CLEAR VARNISH SLURRY

The present invention relates to a novel powder clearcoat material and to a novel aqueous powder clearcoat dispersion particularly suitable as a coating for automobile bodies coated with aqueous basecoat materials.

For the coating of automobile bodies, preference is currently given to the use of liquid coating materials, i.e., spray paints. These cause numerous environmental problems owing to their solvent content. The same applies to cases where aqueous coating materials are employed, since these still always include certain amounts of organic solvents.

For this reason, increased efforts have been made in recent years to use powder coating materials for the coating operation. The results so far, however, have not been satisfactory; in particular, powder clearcoat materials still exhibit weaknesses with regard to chemical resistance and yellowing. Epoxy/carboxy-crosslinked powder clearcoat materials exhibit a markedly poorer resistance to incipient etching by water, tree resin, and sulfuric acid.

In the meantime, many developments have had as their aim to develop powder coating materials in the form of aqueous dispersions which may be processed using liquid coating technologies.

The patent U.S. Pat. No. 4,268,542, for example, discloses a process using a powder coating dispersion based on acrylic resins which is suitable for coating automobiles. In this process, a conventional powder coat is first applied to the body, and then the powder coating dispersion is applied as the clearcoat. With this powder clearcoat dispersion, also referred to by those in the art as a powder slurry or powder clearcoat slurry, ionic thickeners are used, which lead to a relatively high sensitivity of the applied clearcoat film to moisture, especially to condensation. Moreover, it is necessary to operate at high baking temperatures of more than 160° C.

DE-A-196 13 547 discloses an aqueous powder clearcoat slurry which meets the specified requirements. However, following application and crosslinking, slurry, like the solid powder clearcoat materials known to date, exhibits poor stability with respect to incipient etching by water, tree resin, and sulfuric acid. Moreover, the clearcoat produced therewith displays a tendency to yellow.

A further disadvantage of clearcoats produced from the conventional powder clearcoat slurries is their tendency toward delamination if certain aqueous basecoat materials are used. This delamination may be manifested as early as in a change in the color of the aqueous basecoats.

It is an object of the present invention to provide a novel powder clearcoat material and a novel powder clearcoat slurry which no longer have the disadvantages of the prior art but which instead exhibit a much better incipient etch stability and a reduced tendency to yellow after crosslinking. Moreover, the clearcoat produced with the aid of the novel powder clearcoat slurry should adhere firmly to all common aqueous basecoat materials, and should not display any tendency toward delamination.

Accordingly we have found the novel powder clearcoat material and the novel powder clearcoat slurry, comprising a) at least one epoxide-containing binder containing from 0.5 to 40% by weight, based on the binder, of copolymerized glycidyl-containing monomers, and b) at least one tris(alkoxycarbonylamino)triazine and at least one polycarboxylic acid, in particular a straight-chain dicarboxylic acid, and/or a carboxy-functional polyester as crosslinking agent or alternatively a) at least one tris(alkoxycarbonylamino)triazine and at least one oligomeric or polymeric, epoxide-containing crosslinking agent containing from 0.5 to 40% by weight, based on the crosslinking agent, of copolymerized glycidyl-containing monomers, and/or a low molecular mass, epoxide-containing crosslinking agent, and b) at least one carboxyl-containing polymer as binder, both variants comprising c) at least one polyol.

In the text below, the novel powder clearcoat material and the novel powder clearcoat slurry are referred to as the powder clearcoat material of the invention and as the slurry of the invention.

In the light of the prior art it was surprising and unforeseeable for the skilled worker that the powder clearcoat material of the invention and the slurry of the invention would no longer have the disadvantages of the prior art. A particular surprise was that the clearcoats produced with the aid of the slurry of the invention adhere firmly to all kinds of aqueous basecoat materials and no longer exhibit delamination even when the recipes are changed.

The composition of the powder clearcoat material of the invention and of the powder slurry of the invention may vary widely and may be optimized to the particular end use. In accordance with the invention it is of advantage if the powder clearcoat material of the invention and the powder slurry of the invention, based on the respective solids, contain the invention's key constituents a), b) and c) in the following amounts:

a) from 55 to 80, with particular preference from 60 to 78, and in particular from 62 to 75% by weight, b) from 14 to 30, with particular preference from 17 to 25, and in particular from 18 to 23% by weight, and c) from 2 to 22, with particular preference from 4 to 20, and in particular from 6 to 18% by weight.

Suitable epoxy-functional binders a) for the powder clearcoat material of the invention or the slurry of the invention are, for example, polyacrylate resins which contain epoxide groups and are preparable by copolymerizing at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid. Polyacrylate resins of this kind containing epoxide groups are known, for example, from the patents EP-A-0 299 420, DE-B-22 14 650, DE-B-27 49 576, U.S. Pat. No. 4,091,048 and U.S. Pat. No. 3,781,379.

Examples of suitable monomers for inventive use which contain no epoxide group in the molecule are alkyl esters of acrylic and methacrylic acid, especially methyl acrylate, methyl methacrylate, ethyl acrylate, ethyl methacrylate, n-butyl acrylate, n-butyl meth-acrylate, secondary-butyl acrylate, secondary-butyl methacrylate, tert-butyl acrylate, tert-butyl meth-acrylate, neopentyl acrylate, neopentyl methacrylate, 2-ethylhexyl acrylate or 2-ethylhexyl meth-acrylate; amides of acrylic acid and methacrylic acid, especially acrylamide and methacrylamide; vinylaromatic compounds, especially styrene, methylstyrene or vinyltoluene; the nitriles of acrylic acid and methacrylic acid; vinyl halides and vinylidene halides, especially vinyl chloride or vinylidene fluoride; vinyl esters, especially vinyl acetate and vinyl propionate; vinyl ethers, especially n-butyl vinyl ether; or hydroxyl-containing monomers, especially hydroxyethyl acrylate, hydroxyethyl methacrylate, hydroxypropyl acrylate, hydroxypropyl methacrylate, 4-hydroxybutyl acrylate or 4-hydroxybutyl methacrylate.

Examples of suitable epoxy-functional monomers for inventive use are glycidyl acrylate, glycidyl meth-acrylate, or allyl glycidyl ether.

The polyacrylate resin containing epoxide groups normally has an epoxide equivalent weight of from 400 to 2500, preferably from 420 to 700, a number-average molecular weight Mn (determined by gel permeation chromatography using a polystyrene standard) of from 2000 to 20,000, preferably from 3000 to 10,000, and a glass transition temperature Tg of from 30 to 80, preferably from 40 to 70, with particular preference from 40 to 60, and in particular from 48 to 52° C. (measured by means of differential scanning calorimetry (DSC)).

The preparation of the polyacrylate resin containing epoxide groups has no special features but instead takes place in accordance with the customary and known polymerization methods.

The further key constituent of the powder coating material of the invention and of the slurry of the invention is the crosslinking agent a) or b).

In accordance with the invention, at least two different crosslinking agents a) or b) are employed.

In this context, the first crosslinking agent b) comprises tris(alkoxycarbonylamino)triazines and derivatives thereof. Examples of suitable tris(alkoxy-carbonylamino)triazines are described in the patents U.S. Pat. No. 4,939,213, U.S. Pat. No. 5,084,541 or EP-A-0 624 577. Use is made in particular of tris(methoxy-tris(butoxy-and/or tris(2-ethylhexoxy-carbonylamino)triazines.

In accordance with the invention, preference is given to the methyl butyl mixed esters, the butyl 2-ethylhexyl mixed esters, and the butyl esters. These have the advantage over the straight methyl ester of better solubility in polymer melts.

The tris(alkoxycarbonylamino)triazines and their derivatives may also be used in a mixture with conventional crosslinking agents. Particularly suitable for this purpose are polyisocyanates different than the tris(alkoxycarbonylamino)triazines. It is also possible to use amino resins, examples being melamine resins. In this context it is possible to use any amino resin suitable for transparent topcoat materials or clearcoat materials, or a mixture of such amino resins.

Resins of this kind are well known to the skilled worker and are supplied by numerous companies as commercial products.

The second crosslinking agent b) comprises carboxylic acids, especially saturated, straight-chain, aliphatic dicarboxylic acids having 3 to 20 carbon atoms in the molecule. Instead of them or in addition to them it is also possible to use carboxy-functional polyesters. With very particular preference, dodecane-1,12-dicarboxylic acid is used.

In order to modify the properties of the powder coating materials and slurries of the invention it is possible to use minor amounts of other carboxyl-containing crosslinking agents. Examples of suitable additional crosslinking agents of this type are saturated branched or unsaturated straight-chain dicarboxylic and polycarboxylic acids and also the carboxyl-containing polymers described below in detail as binders b).

In accordance with the invention, in a second variant, the powder clearcoat materials and slurries of the invention may comprise an epoxy-functional crosslinking agent a) and a carboxyl-containing binder b).

Examples of suitable carboxyl-containing binders b) for use in accordance with the invention are, for example, polyacrylate resins prepared by copolymerizing at least one ethylenic unsaturated monomer containing at least one acid group in the molecule with at least one further ethylenically unsaturated monomer containing no acid groups in the molecule.

Examples of highly suitable carboxyl-containing binders b) for use in accordance with the invention are the polyacrylates and polymethacrylates described below under number 1. and also numbers 1.1 to 1.4, with a copolymerized acrylic acid and/or methacrylic acid content >0% by weight.

Examples of suitable oligomeric and polymeric epoxy-functional crosslinking agents a) for use in accordance with the invention are the above-described binders a) containing epoxide groups.

Examples of suitable low molecular mass epoxy-functional crosslinking agents a) for use in accordance with the invention are low molecular mass compounds containing at least two glycidyl groups, especially pentaerythritol tetraglycidyl ether or triglycidyl isocyanurate.

The binder a) containing epoxide groups and the carboxyl-containing crosslinking agent b) of the first variant of the invention, or the carboxyl-containing binder b) and the epoxy-functional crosslinking agent a) of the second variant of the invention, are generally used in a ratio such that there are from 0.5 to 1.5, preferably from 0.75 to 1.25, equivalents of carboxyl groups per equivalent of epoxide groups. The amount of carboxyl groups present may be determined simply by titration with an alcoholic KOH solution.

In accordance with the invention, the epoxy-functional binder a) or the oligomeric or polymeric, epoxy-functional crosslinking agent a) contains vinylaromatic compounds such as styrene in copolymerized form. In order to limit the risk of cracking on weathering, the amount is, however, not more than 35% by weight, based on the binder a) or the crosslinking agent a). Preferably, from 10 to 25% by weight is incorporated by copolymerization.

The further key constituent of the powder clearcoat material of the invention and of the slurry of the invention is at least one polyol c).

Suitable polyols c) for use in accordance with the invention include all low molecular mass compounds, oligomers and polymers which contain at least two, preferably at least three, primary and/or secondary hydroxyl groups and which do not destroy the solid state of the powder coating material of the invention and of the slurry of the invention.

Examples of suitable oligomers and polymers c) for use in accordance with the invention are linear and/or branched and/or block, comb and/or random poly(meth)-acrylates, polyesters, polyurethanes, acrylated poly-urethanes, acrylated polyesters, polylactones, poly-carbonates, polyethers, (meth)acrylatediols, polyureas or oligomeric polyols.

Where these oligomers and polymers are used as polyols c), they preferably contain no carboxyl groups.

These oligomers and polymers are known to the skilled worker, and numerous suitable compounds are available on the market.

Of these oligomers and polymers c), the polyacrylates, the polyesters and/or the acrylated polyurethanes are of advantage and are therefore used with preference.

Examples of particularly preferred oligomers and polymers c) for use in accordance with the invention are 1. Polyacrylates having a hydroxyl number of from 40 to 240, preferably from 60 to 210, in particular from 100 to 200, an acid number of from 0 to 35, glass transition temperatures of from −35 to +85° C. and number average molecular weights Mn of from 1500 to 300 000.

The glass transition temperature of the polyacrylates is determined, as is known, by the nature and amount of the monomers used. The selection of the monomers may be made by the skilled worker with the assistance of the following formula V, in accordance with which the glass transition temperatures may be calculated approximately.

$$1/Tg = \sum_{n=1}^{n=x} W_n/Tg_n; \sum_n W_n = 1 \qquad (V)$$

Tg=Glass transition temperature of the polyacrylate resin
$W_n$=Weight fraction of the n-th monomer
$Tg_n$=Glass transition temperature of the homopolymer of the n-th monomer
x=Number of different monomers.

Measures to control the molecular weight (e.g., selection of appropriate polymerization initiators, use of chain transfer agents or of specific techniques of polymerization, etc.) are part of the art and need not be illustrated further here.

1.1 Particularly preferred polyacrylates are preparable by polymerizing (a1) from 10 to 92, preferably from 20 to 60% by weight of an alkyl methacrylate or cycloalkyl methacrylate having 1 to 18, preferably 4 to 13 carbon atoms in the alkyl or cycloalkyl radical, or mixtures of such monomers, (a2) from 8 to 60, preferably from 12.5 to 50.0% by weight of a hydroxyalkyl acrylate or a hydroxyalkyl methacrylate having 2 to 4 carbon atoms in the hydroxyalkyl radical, or mixtures of such monomers, (a3) from 0 to 5, preferably from 0.7 to 3% by weight of acrylic acid or methacrylic acid or mixtures of these monomers, and (a4) from 0 to 50, preferably up to 30% by weight of ethylenically unsaturated monomers different than but copolymerizable with (a1), (a2) and (a3), or mixtures of such monomers, to give polyacrylates of the specification stated above.

Examples of suitable (a1) components are methyl, ethyl, propyl, n-butyl, isobutyl, tert-butyl, pentyl, hexyl, heptyl or 2-ethylhexyl acrylate or methacrylate and also cyclohexyl, tert-butylcyclohexyl or isobornyl acrylate or methacrylate.

Examples of suitable (a2) components are hydroxyethyl, hydroxypropyl or hydroxybutyl or hydroxymethylcyclohexyl acrylate or methacrylate or adducts of (meth)acrylic acid and epoxides, such as Versatic acids® glycidyl esters.

Examples of suitable (a4) components are vinylaromatics such as styrene, vinyltoluene, alpha-methylstyrene, alpha-ethylstyrene, ring-substituted diethylstyrenes, isopropylstyrene, butylstyrene and methoxystyrenes; vinyl ethers such as ethyl vinyl ether, n-propyl vinyl ether, isopropyl vinyl ether, n-butyl vinyl ether or isobutyl vinyl ether; vinyl esters such as vinyl acetate, vinyl propionate, vinyl butyrate, vinyl pivalate or the vinyl ester of 2-methyl-2-ethylheptanoic acid; or allyl ethers such as trimethylolpropane monoallyl, diallyl or triallyl ether, or ethoxylated or propoxylated allyl alcohol.

1.2 Further examples of particularly preferred polyacrylates are described in the European patent application EP-A-0 767 185 and in the American patents U.S. Pat. Nos. 5,480,493, 5,475,073 or 5,534,598.

1.3 Further examples of particularly preferred polyacrylates are sold under the brand name Joncryl®, such as, for instance, Joncryl®SCX 912 and 922,5.

1.4 Further examples of particularly preferred polyacrylates are those obtainable by polymerizing (a1) from 10 to 51% by weight, preferably from 25 to 41% by weight, of 4-hydroxy-n-butyl acrylate or methacrylate or a mixture thereof, but especially 4-hydroxy-n-butyl acrylate, (a2) from 0 to 36% by weight, preferably from 0.1 to 20% by weight, of a non-(a1) hydroxyl-containing ester of acrylic acid or of methacrylic acid, or a mixture thereof, (a3) from 28 to 85% by weight, preferably from 40 to 70% by weight, of a non-(a1) or -(a2) aliphatic or cycloaliphatic ester of methacrylic acid having at least 4 carbon atoms in the alcohol residue, or of a mixture of such monomers, (a4) from 0 to 3% by weight, preferably from 0.1 to 2% by weight, of an ethylenically unsaturated carboxylic acid or a mixture of such acids, and (a5) from 0 to 20% by weight, preferably from 5 to 15% by weight, of a non-(a1), -(a3) or -(a4) unsaturated monomer, or a mixture of such monomers, to give a polyacrylate having a hydroxyl number of from 60 to 200, preferably from 100 to 160, an acid number of from 0 to 35, and a number average molecular weight $M_n$ of from 1500 to 10 000, the composition of component (a3) being chosen such that polymerization of this component (a3) alone gives a polymethacrylate having a glass transition temperature of from +10 to +100° C., preferably from +20 to +60° C.

Examples of suitable components (a2) are hydroxyalkyl esters of acrylic acid and methacrylic acid such as hydroxyethyl or hydroxypropyl acrylate or methacrylate, the choice being made such that polymerization of this component (a2) alone gives a polyacrylate having a glass transition temperature of from 0 to +80° C., preferably from +20 to +60° C.

Examples of suitable components (a3) are aliphatic esters of methacrylic acid having from 4 to 20 carbon atoms in the alcohol residue, such as n-butyl, isobutyl, tert-butyl, 2-ethyshexyl, stearyl and lauryl methacrylate; or cycloaliphatic esters of methacrylic acid, such as cyclohexyl methacrylate.

Examples of suitable components (a4) are acrylic acid and/or methacrylic acid .

Examples of suitable components (a5) are vinylaromatic hydrocarbons such as styrene, alpha-alkylstyrene or vinyltoluene; amides of acrylic acid and methacrylic acid such as methacrylamide and acrylamide; nitriles of acrylic acid and methacrylic acid; vinyl ethers or vinyl esters, the composition of this component (a5) preferably being made such that polymerization of components (a5) alone results in a polyacrylate having a glass transition temperature of from +70 to +120° C., in particular from +80 to +1000° C.

1.5 The preparation of these polyacrylates is widely known and is described, for example, in the standard work Houben-Weyl, Methoden der organischen Chemie, 4th edition, Volume 14/1, pages 24 to 255, 1961.

2. Polyester resins which are preparable by reacting (a1) at least one cycloaliphatic or aliphatic polycarboxylic acid, (a2) at least one aliphatic or cycloaliphatic polyol containing more than two hydroxyl groups in the molecule, (a3) at least one aliphatic or cycloaliphatic diol, and (a4) at least one aliphatic, linear or branched saturated monocarboxylic acid, in a molar ratio of (a1):(a2):(a3):(a4)=1.0:0.2 to 1.3:0.0 to 1.1:0.0 to 1.4, preferably 1.0:0.5 to 1.2:0.0 to 0.6:0.2 to 0.9, to give a polyester or alkyd resin.

Examples of suitable components (a1) are hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid or sebacic acid.

Examples of suitable components (a2) are pentaerythritol, trimethylolpropane, triethylol-ethane and glycerol.

Examples of suitable components (a3) are ethylene glycol, diethylene glycol, propylene glycol, neopentyl glycol, 2-methyl-2-propyl-1,3-propane-diol, 2-methyl-2-butyl-1,3-propanediol, 2,2,4-trimethyl-1,5-pentanediol, 2,2,5-trimethyl-1,6-hexanediol, neopentyl glycol hydroxypivalate or dimethylolcyclohexane.

Examples of suitable components (a4) are 2-ethylhexanoic acid, lauric acid, isooctanoic acid, isononanoic acid or monocarboxylic acid mixtures obtained from coconut oil or palm kernel Oil.

The preparation of the polyesters and alkyd resins used with preference in accordance with the invention is widely known and is described, for example, in the standard work Ullmanns Encyklopädie der technischen Chemie, 3rd edition, Volume 14, Urban & Schwarzenberg, Munich, Berlin, 1963, pages 80 to 89 and pages 99 to 105, and also in the following books: "Rēsines Alkydes-Polyesters" by J. Bourry, Paris, Dunod, 1952, "Alkyd Resins" by C. R. Martens, Reinhold Publishing Corporation, New York, 1961, and "Alkyd Resin Technology" by T. C. Patton, Interscience Publishers, 1962.

3. Polyurethanes as described in the patents EP-A-0 708 788, DE-A-44 01 544 or DE-A-195 34 361.

Further examples of inventively suitable oligomers c) are oligomeric polyols which are obtainable by hydroformylation and subsequent hydrogenation from oligomeric intermediates obtained by metathesis reactions of acyclic monoolefins and cyclic monoolefins; examples of suitable cyclic monoolefins are cyclobutene, cyclopentene, cyclohexene, cyclo-octene, cycloheptene, norbornene or 7-oxanorbornene; examples of suitable acyclic monoolefins are present in hydrocarbon mixtures which are obtained in petroleum processing by cracking (C5 cut); examples of suitable oligomeric polyols for use in accordance with the invention have a hydroxyl number (OHN) of from 200 to 450, a number average molecular weight Mn of from 400 to 1000, and a mass average molecular weight $M_w$ of from 600 to 1100;

Examples of suitable low molecular mass compounds c) for use in accordance with the invention are branched, cyclic and/or acyclic $C_9$–$C_{16}$ alkanes functionalized with at least two hydroxyl groups, especially diethyl-octanediols, and also cyclohexanedimethanol, neopentyl glycol hydroxypivalate, neopentyl glycol, trimethylol-propane or pentaerythritol.

Of the above-described polyols c) for use in accordance with the invention, the carboxyl-free polyacrylates and polymethacrylates which are described above in section 1.1 are of very particular advantage and are therefore used with very particular preference.

The powder clearcoat materials and slurries of the invention may comprise one or more suitable catalysts for curing the epoxy resins. Examples of suitable catalysts are phosphonium salts and tetraalkylammonium salts of organic and inorganic acids, amines, imidazole and imidazole derivatives. The catalysts are used in general in amounts of from 0.001 to 2% by weight, based on the overall weight of the component a) or b) containing epoxide groups, and also of the component b) or a) containing carboxyl groups.

Examples of suitable phosphonium salts are ethyltriphenylphosphonium iodide, ethyltriphenyl-phosphonium chloride, ethyltriphenylphosphonium thio-cyanate, ethyltriphenylphosphonium acetate-acetic acid complex, tetrabutylphosphonium iodide, tetrabutyl-phosphonium bromide or tetrabutylphosphonium acetate-acetic acid complex. These and other suitable phosphonium catalysts are described, for example, in the patents U.S. Pat. No. 3,477,990 and U.S. Pat. No. 3,341,580.

Examples of suitable tetraalkylammonium salts are cetyl-trimethylammonium bromide and dicetyldimethyl-ammonium bromide.

Examples of suitable imidazole catalysts are 2-styryl-imidazole, 1-benzyl-2-methylimidazole, 2-methyl-imidazole and 2-butylimidazole. These and other suitable imidazole catalysts are described in the Belgian patent No. 756,693.

In addition, the powder coating materials and slurries of the invention may comprise auxiliaries and additives. Examples of suitable auxiliaries and additives are leveling agents, antioxidants, UV absorbers, free-radical scavengers, free-flow aids, and devolatilizers like benzoin.

The preparation of the powder clearcoat materials of the invention has no special features in terms of process but instead takes place in accordance with the known methods, as described, for example, in the BASF Lacke+Farben AG product information "Pulverlacke" [Powder coatings], 1990, by homogenizing and dispersing using, for example, an extruder or screw compounder. Following their preparation, the powder coating materials of the invention are prepared for dispersion by milling and, if desired, by sieving and classifying.

The powder clearcoat material of the invention may, however, also be present in the form of an aqueous dispersion, comprising as component I the powder clearcoat material of the invention described in detail above, plus an aqueous component II. In that case, the material in question is the slurry of the invention.

The slurry of the invention contains, based on its overall amount, the component I in an amount of from 5 to 80, preferably from 10 to 70, with particular preference from 15 to 60, and in particular from 20 to 50% by weight.

The aqueous component II for use in accordance with the invention consists substantially of water. However, it may itself constitute a dispersion comprising IIa) at least one nonionic thickener and, if desired, IIb) catalysts, auxiliaries, defoamers, dispersing aids, preferably carboxy-functional dispersing aids, wetting agents, antioxidants, UV absorbers, free-radical scavengers, small amounts of solvents, leveling agents, biocides and/or water retention agents.

In accordance with the invention the component II contains, based on its overall amount, from 0.01 to 20, preferably from 1 to 15, with particular preference from 2 to 10, and in particular from 5 to 9% by weight of component IIa) and also from 0.001 to 20, preferably from 0.01 to 15, with particular preference from 0.1 to 10, and in particular from 1 to 9% by weight of component IIb).

The suitable nonionic associative thickeners have the following structural features:

Iaa) a hydrophilic structure which ensures sufficient solubility in water, and

Iab) hydrophobic groups capable of associative interaction in the aqueous medium.

Examples of suitable hydrophobic groups are long-chain alkyl radicals such as dodecyl, hexadecyl, or octadecyl radicals or alkylaryl radicals such as octylphenyl or nonylphenyl radicals.

Examples of suitable hydrophilic structures are polyacrylates, cellulose ethers or, in particular, polyurethanes, which contain the hydrophilic groups as polymer building blocks. Particularly preferred hydrophilic structures in this context are polyurethanes containing polyether chains, preferably from polyethylene oxide, as building blocks.

Such polyether polyurethanes are synthesized using the diisocyanates and/or polyisocyanates, preferably aliphatic diisocyanates, especially unsubstituted or alkyl-substituted 1,6-hexamethylene diisocyanate, for linking the hydroxyl-terminated polyether building blocks with one another and for linking the polyether building blocks with the hydrophobic end-group building blocks, which may, for example, be monofunctional alcohols and/or amines having the abovementioned long-chain alkyl radicals and/or alkylaryl radicals.

The slurry of the invention may be prepared from components I and II by wet grinding or by stirred incorporation of dry-ground powder clearcoat material of the invention. Particular preference is given to wet grinding.

The present invention therefore also provides a process for preparing the slurry of the invention on the basis of component I, which in accordance with the invention is dispersed in component II. In the text below, this process is referred to as the "process of the invention".

In the preferred procedure of the process of the invention, following the dispersion of component I in component II, grinding takes place, after which the pH is adjusted to 4.0 to 7.0 and the resulting slurry is filtered.

In accordance with the invention, the average particle size of component I in the slurry of the invention is between 1 and 25 micrometers, preferably below 20 micrometers, and in particular from 3 to 10 micrometers. The solids content of the slurry of the invention, based on its overall amount, is preferably between 15 and 50% by weight.

In the procedure of the invention, before or after the wet grinding or the introduction of the powder clearcoat material of the invention (component I) into the water or the aqueous medium (component II), up to 5% by weight, based on the overall amount of components I and II, of a defoamer mixture, of an ammonium salt and/or alkali metal salt, of a carboxy-functional or nonionic dispersing aid, wetting agent and/or thickener mixture, and also of the other additives, may be added. Preferably, these additives are first dispersed in water, after which the powder clearcoat material of the invention is stirred in, in small portions. Subsequently, the additives are stirred in again, followed by the powder clearcoat material of the invention, in small portions.

The pH is preferably adjusted using ammonia and/or amines. The pH may initially rise, giving a strongly basic dispersion. However, the pH falls back to the desired levels within a few hours or days.

The resulting slurry of the invention may be used as a coating over basecoat materials, preferably in the automotive industry. The slurry of the invention is especially suitable for the preparation of clearcoat materials on aqueous basecoat materials based on polyesters and/or polyurethane resins on the one hand and amino resins on the other.

The slurry of the invention may be applied with the methods known from liquid coating technology. In particular, it may be applied by means of spraying techniques. Suitable techniques in this context include electrostatically assisted application using high-speed rotating bells, or pneumatic application.

The slurries of the invention applied to the basecoat films are generally flashed off prior to baking. This takes place judiciously first at room temperature and then at a slightly elevated temperature. In general, the elevated temperature is from 40 to 70° C., preferably from 50 to 65° C. Flashoff is conducted for 2 to 10 minutes, preferably 4 to 8 minutes, at room temperature. At elevated temperature, flashing off is repeated for the same period of time.

Baking may be carried out at temperatures as low as 130° C. However, baking temperatures from 130 to 180° C., in particular from 135 to 1550°C., are also suitable.

Using the process of the invention it is possible to achieve film thicknesses of from 30 to 50 micrometers, in particular from 35 to 45 micrometers. Clearcoats of comparable quality could previously—in accordance with the prior art—be prepared only using powder clearcoat material and only in film thicknesses of from 65 to 80 micrometers. The particular advantage of the clearcoats produced by the procedure of the invention from the slurries of the invention is that their incipient etch resistance with respect to water, tree resin and sulfuric acid is improved, their yellowing tendency is significantly reduced, and their adhesion to the basecoat films is considerably enhanced.

EXAMPLE 1 AND COMPARATIVE EXPERIMENT C1

1. The Preparation of the Starting Compounds 1.1 The Preparation of a Glycidyl-containing Acrylic Resin as Binder a)

21.1 parts of xylene were charged to an appropriate reaction vessel and heated to 130° C. To this initial charge there were added at 130° C. the initiator, consisting of 4.5 parts of TBPEH (tert-butyl perethylhexanoate) and 4.86 parts of xylene, and the monomer mixture, consisting of 10.78 parts of methyl methacrylate, 25.5 parts of n-butyl methacrylate, 17.39 parts of styrene and 23.95 parts of glycidyl methacrylate, these components being metered in over the course of four hours from two separate feed vessels. Subsequently, the resulting mixture was heated to 180°C. and the solvent was stripped off in vacuo at less than 100 mbar. This gave the acrylic resin 1.1.

1.2 The Preparation of a Hydroxyl-containing Acrylic Resin as Polyol c)

23.83 parts of xylene were charged to an appropriate reaction vessel and heated to 130°C. To this initial charge there were added at 130°C. the initiator, consisting of 4.03 parts of TBPEH (tert-butyl perethylhexanoate) and 4.03 parts of xylene, and the monomer mixture, consisting of 17.45 parts of methyl methacrylate, 14.09 parts of n-butyl methacrylate, 16.78 parts of styrene and 18.79 parts of hydroxypropyl methacrylate, these components being metered in over the course of four hours from two separate feed vessels. Thereafter, the two feed vessels were rinsed out with 0.5 part of xylene. Subsequently, the resulting reaction mixture was heated to 180°C. and the solvent was stripped off in vacuo at less than 100 mbar. This gave the acrylic resin 1.2.

2. The Preparation of Powder Clearcoat Materials 2.1 The Preparation of a Noninventive Powder Clearcoat Material for the Comparative Experiment C1

73.5 parts of acrylic resin 1.1, 17.8 parts of dodecanedicarboxylic acid, 5.0 parts of solvent-free tris(alkoxycarbonylamino)triazine, 2 parts of Tinuvin 1130 (UV absorber from Ciba-Geigy), 0.9 part of Tinuvin 144 (light stabilizer based on a hindered amine (HALS) from Ciba-Geigy), 0.4 part of Additol XL (leveling agent from Hoechst AG) and 0.4 part of benzoin (devolatilizer) were intimately mixed in a Henschel fluid mixer, the mixture was extruded on a BUSS PLK 46 extruder, and the extrudate was ground on a Hosokawa ACM 2 mill. The powder clearcoat material was sieved off through a 125 micrometer sieve. This gave the noninventive powder clearcoat material 2.1.

The solvent-free tris(alkoxycarbonylamino)triazine itself was obtained by removing the solvent from the commercial resin solution (51% strength in n-butanol, from Cytec) by distillation under reduced pressure at from 50 to 130° C. and discharging the resulting resin melt onto a pelletizing cooling belt or into a cooling pan.

2.2 The Preparation of an Inventive Powder Clearcoat Material for Example 1

62.8 parts of the acrylic resin 1.1, 13.5 parts of dodecanedicarboxylic acid, 5.0 parts of solvent-free tris(alkoxycarbonylamino)triazine, 14.8 parts of acrylic resin 1.2, 2.0 parts of Tinuvin 1130, 0.9 part of Tinuvin 144 and 0.4 part of Additol XL 490 were mixed, extruded, ground and sieved as described above in section 2.1. This gave the inventive powder clearcoat material 2.2.

3. The Preparation of Powder Clearcoat Slurries 0.6 part of Troykyd D777 (defoamer from Troy Chemical Company), 0.6 part of Orotan 731K (dispersing aid from Rohm & Haas), 0.06 part of Surfynol TMN 6 (wetting agent from Air Products) and 16.5 parts of RM8 (nonionic, polyurethane-based associative thickener from Rohm & Haas) were dispersed in 400 parts of deionized water. Then 94 parts of the powder clearcoat material 2.1 or 2.2 were introduced in small portions with stirring. Subsequently, a further 0.6 part of Troykyd D777, 0.6 part of Orotan 731K, 0.06 part of Surfynol TMN 6 and 16.5 parts of RM8 were incorporated by dispersion. Thereafter, a further 94 parts of the powder clearcoat material 2.1 or 2.2 were incorporated with stirring, in small portions.

The resulting mixtures were ground for 3.5 hours in a sand mill. The subsequently measured average particle size was 4 micrometers. The powder clearcoat slurries were filtered through a 50 micrometer filter and admixed with 0.05% by weight, based on their overall amount, of Byk 345 (leveling agent from Byk).

Using the noninventive powder clearcoat material 2.1, the noninventive powder clearcoat slurry 3.1 was obtained.

Using the inventive powder clearcoat material 2.2, the inventive powder clearcoat slurry 3.2 was obtained.

4. The Application of the Inventive Powder Clearcoat Slurry 3.2 (example 1) and the Noninventive Powder Clearcoat Slurry 3.1 (Comparative Experiment C1)

The powder clearcoat slurries 3.1 and 3.2 were applied using a so-called integrated system, which is described below for the metallic shade jungle green.

Using a gravity-fed cup gun, a functional coat of the material Ecoprimee® from BASF Coatings AG was applied to steel panels coated cathodically with a commercial electrocoat material. After flashing off at room temperature for five minutes, a green aqueous metallic basecoat material (Ecostar® jungle green from BASF Coatings AG) was applied in the same way to the previous film and then was predried at 80° C. for five minutes. After the panels had been cooled, the powder clearcoat slurries 3.1 and 3.2 were applied in the same way. After ten minutes of predrying at 40° C., the coated panels were baked at 145° C. This gave two overall metallic coating systems in the jungle green shade.

When using the inventive powder clearcoat slurry 3.2, the thickness of the wet films was chosen so that baking gave dry film thicknesses of the functional coat and of the metallic aqueous basecoat of 15 micrometers in each case; the thickness of the inventive clearcoat was 44 micrometers (test panels 4.2; example 1).

When using the noninventive powder clearcoat slurry 3.1, the dry film thicknesses of the functional coat and of the metallic aqueous basecoat were likewise each 15 micrometers; the thickness of the noninventive clearcoat was 46 micrometers (test panels 4.1; comparative experiment C1).

5 The Testing of the Chemical Resistance of the Test Panels 4.2 (Example 1) and of the Test Panels 4.1 (Comparative Experiment C1)

Tree resin (0.025 ml) and 1% strength sulfuric acid (0.025 ml) were applied to the test panels 4.2 and 4.1. The test panels were then subjected to heat in a gradient oven from Byk for 30 minutes. The temperature at which initial damage occurred was found.

In the case of the test with tree resin, this was 59° C. for the inventive test panels 4.2 (example 1) and 53° C. for the noninventive test panels 4.1 (comparative experiment C1).

In the Case of the Test with Sulfuric Acid, this was 52° C. for the Inventive Test Panels 4.2 (Example 1) and 51° C. for the Noninventive Test Panels 4.1 (Comparative Experiment C1).

6. The Testing of the Mechano-technological Properties of the Inventive Test Panels 4.2 (Example 1) and of the Noninventive Test Panels 4.1 (Comparative Experiment C1)

The table gives an overview of the mechano-technological tests and the results obtained in them.

TABLE

Mechano-technological properties of the inventive (4.2) and noninventive (4.1) test panels

| Test methods | Example 1 Comparative | experiment C1 |
|---|---|---|
| Mercedes-Benz (MB) ball impact, material removed at −20° C. [mm$^2$] | 7 | 6 |
| MB ball impact, corrosion at −20° C. [rating 0 to 5] | 1 | 1 |
| Scratch test to DBL 7399 [rating 0 to 5] | 1.5 | 1.5 |
| Scratch test after 240 hours of constant condensation conditions (CCC) [rating 0 to 5] | 1.0 | 2.0 |
| Cross-hatch to DIN 53151 (2 mm) [rating 0 to 5] | 0 | 0 |
| Cross-hatch after 240 hours of CCC and 24 hours of regeneration | 0 | 1 |
| High-pressure cleaning resistance, delamination at the scribe mark$^{a)}$ (%) | 0 | 20 |

[rating 0 to 5]:
0 = best;
5 = worst a) The test panels were scored in the center over a length of 10 cm using the scribe cutter customary for corrosion tests. The test panels, lying horizontally on the base, were then sprayed with unheated mains water, using a standard commercial high-pressure cleaner with a rotating front nozzle, at a pressure of 230 bar, the cleaning lance passing five times over the scribe mark in its lengthwise direction at a distance of 10 cm. In the case of the noninventive test panel 4.1, there were instances of small-area delamination of the clearcoat within a strip at a distance of 1 cm from the scribe mark, the delamination corresponding to about 20% of the area mentioned. In the case of the inventive test panel 4.2, the entire panel remained undamaged and there was no delamination at the scribe mark whatsoever.

The comparison of the results obtained shows that the inventive clearcoat material possessed much better adhesion to the aqueous basecoat material than did the convention.al clearcoat material.

What is claimed is:

1. A powder clearcoat material or powder clearcoat slurry comprising
   a) at least one epoxide-containing binder containing from 0.5 to 40% by weight, based on the binder, of copolymerized glycidyl-containing monomers,
   b) at least one tris(alkoxycarbonylamino)triazine and at least one compound selected from the group consisting of polycarboxylic acid, and a carboxy-functional polyester, and mixtures thereof, as crosslinking agent, and
   c) at least one polyol.

2. The powder clearcoat material or powder clearcoat slurry as claimed in claim 1, comprising at least one polycarboxylic acid, selected from the group consisting of straight-chain dicarboxylic acids.

3. The powder clearcoat material or powder clearcoat slurry as claimed in claim 1, comprising, based on weight of solids, the constituents a), b) and c) in the following amounts:
   a) from 55 to 80% by weight,
   b) from 14 to 30% by weight, and
   c) from 2 to 22% by weight.

4. The powder clearcoat material or powder clearcoat slurry as claimed in claim 1, wherein polyols c) comprise low molecular mass compounds, selected from the group consisting of oligomers and polymers containing at least two, primary or secondary hydroxyl groups, wherein the polyol (c) does not destroy the solid state of the powder clearcoat material or powder clearcoat slurry.

5. The powder clearcoat material or powder clearcoat slurry as claimed in claim 4, wherein low molecular mass compounds c) are selected from the group consisting of branched, cyclic and acyclic $C_9$–$C_{16}$ alkanes functionalized with at least two hydroxyl groups.

6. The powder clearcoat material or powder clearcoat slurry as claimed in claim 4, wherein oligomers and polymers c) are selected from the group consisting of linear, branched, block, comb and random poly (meth) acrylates, polyesters, polyurethanes, acrylated polyurethanes, acrylated polyesters, polylactones, polycarbonates, polyethers, (meth)acrylatediols, polyureas and oligomeric polyols, and mixtures thereof.

7. The powder clearcoat material or powder clearcoat slurry as claimed in claim 6, wherein polyols c) are selected from the group consisting of oligomers obtained by metathesis reactions from acyclic monoolefins and cyclic monoolefins to give oligomeric intermediates, and their subsequent hydroformylation and hydrogenation.

8. The powder clearcoat material or powder clearcoat slurry as claimed in claim 6, wherein polymers used as component c) is selected from the group consisting of polyacrylates, polyesters and acrylated polyurethanes and mixtures thereof.

9. The powder clearcoat material or powder clearcoat slurry as claimed in claim 6, wherein the polyacrylates used as component c) are prepared by polymerizing (a1) from 10 to 92% by weight of compounds selected from the group consisting of alkyl methacrylate. cycloalkyl methacrylate having 1 to 18 carbon atoms in the alkyl or cycloalkyl radical, and mixtures of such monomers, (a2) from 8 to 60% by weight of compounds selected from the group consisting of hydroxyalkyl acrylate, hydroxyalkyl methacrylate having 2 to 4 carbon atoms in the hydroxyalkyl radical, and mixtures of such monomers, (a3) from 0 to 5% by weight of compounds selected from the group consisting of acrylic acid, methacrylic acid and mixtures of these monomers, and (a4) from 0 to 50% by weight of ethylenically unsaturated monomers different than but copolymerizable with (a1), (a2) and (a3), and mixtures of such monomers.

10. A clearcoat produced from the powder clearcoat material or powder clearcoat slurry as claimed in claim 1.

11. A powder clearcoat material or powder clearcoat slurry comprising
    a) at least one tris(alkoxycarbonylamino)triazine and at least one oligomeric or polymeric, epoxide-containing crosslinking agent containing from 0.5 to 40% by weight, based on the crosslinking agent, of compounds selected from the group consisting essentially of copolymerized glycidyl-containing monomers, and a low molecular mass, epoxide-containing crosslinking agent,
    b) at least one carboxyl-containing polymer as binder in an amount from 14 to less than 25% by weight of solids, and
    c) at least one polyol.

12. The powder clearcoat material or powder clearcoat slurry as claimed in claim 1, comprising, based on weight of solids, the constituents a), b) and c) in the following amounts:
    a) from 60 to 78% by weight,
    b) from 17 to 25% by weight, and
    c) from 4 to 20% by weight.

13. The powder clearcoat material or powder clearcoat slurry as claimed in claim 4, wherein low molecular mass compounds c) are selected from the group consisting of diethyloctanediols, cyclohexanedimethanol, neopentyl glycol hydroxy pivalate, neopentyl glycol, trimethylolpropane and pentaerythritol.

14. A powder clearcoat material or powder clearcoat slurry comprising
    a) at least one tris(alkoxycarbonylamino)triazine and at least one oligomeric or polymeric, epoxide-containing crosslinking agent containing from 0.5 to 40% by weight, based on the crosslinking agent, of compounds selected from the group consisting essentially of copolymerized glycidyl-containing monomers, and a low molecular mass, epoxide containing crosslinking agent,
    b) at least one carboxyl-containing polymer as binder,
    c) at least one polyol, and
    d) at least one polycarboxylic acid, selected from the group consisting of straight-chain dicarboxylic acids.

15. The powder clearcoat material or powder clearcoat slurry as claimed in claim 11, comprising, based on weight of solids, the constituents a), b) and c) in the following amounts:
    a) from 55 to 80% by weight,
    b) from 14 to 23% by weight, and
    c) from 2 to 22% by weight.

16. The powder clearcoat material or powder clearcoat slurry as claimed in claim 11, wherein polyols c) comprise low molecular mass compounds, selected from the group consisting of oligomers and polymers containing at least two, primary or secondary hydroxyl groups, wherein the polyol (c) does not destroy the solid state of the powder clearcoat material or powder clearcoat slurry.

17. The powder clearcoat material or powder clearcoat slurry as claimed in claim 13, wherein low molecular mass compounds c) are selected from the group consisting of branched, cyclic and acyclic $C_9$–$C_{16}$ alkanes functionalized with at least two hydroxyl groups.

18. The powder clearcoat material or powder clearcoat slurry as claimed in claim 13, wherein oligomers and polymers c) are selected from the group consisting of linear, branched, block, comb and random poly (meth) acrylates, polyesters, polyurethanes, acrylated polyurethanes, acrylated polyesters, polylactones, polycarbonates, polyethers, (meth)acrylatediols, polyureas and oligomeric polyols, and mixtures thereof.

19. The powder clearcoat material or powder clearcoat slurry as claimed in claim 18, wherein polyols c) are selected from the group consisting of oligomers obtained by metathesis reactions from acyclic monoolefins and cyclic monoolefins to give oligomeric intermediates, and their subsequent hydroformylation and hydrogenation.

20. The powder clearcoat material or powder clearcoat slurry as claimed in claim 18, wherein polymers used as component c) is selected from the group consisting of polyacrylates, polyesters and acrylated polyurethanes and mixtures thereof.

21. The powder clearcoat material or powder clearcoat slurry as claimed in claim 18, wherein the polyacrylates used as component c) are prepared by polymerizing (a1) from 10 to 92% by weight of compounds selected from the group consisting of alkyl methacrylate and cycloalkyl methacrylate having 1 to 18 carbon atoms in the alkyl or cycloalkyl radical, and mixtures of such monomers, (a2) from 8 to 60% by weight of compounds selected from the group consisting of hydroxyalkyl acrylate and hydroxyalkyl methacrylate having 2 to 4 carbon atoms in the hydroxyalkyl radical, and mixtures of such monomers, (a3) from 0 to 5% by weight of compounds selected from the group consisting of acrylic acid, methacrylic acid and mixtures of these monomers, and (a4) from 0 to 50% by weight of ethylenically unsaturated monomers different than but copolymerizable with (a1), (a2) and (a3), and mixtures of such monomers.

22. A clearcoat produced from tie powder clearcoat maternal or powder clearcoat slurry as claimed in claim 1.

23. A clearcoat produced from the powder clearcoat material or powder clearcoat slurry as claimed in claim 11.

24. The powder clearcoat material or powder clearcoat slurry as claimed in claim 11, comprising at least one polycarboxylic acid, selected from the group consisting of straight-chain dicarboxylic acids.

* * * * *